United States Patent [19]
MacDonald

[11] Patent Number: 5,375,033
[45] Date of Patent: * Dec. 20, 1994

[54] MULTI-DIMENSIONAL PRECISION MICRO-ACTUATOR

[75] Inventor: Noel C. MacDonald, Ithaca, N.Y.

[73] Assignee: Cornell Research Foundation, Inc., Ithaca, N.Y.

[*] Notice: The portion of the term of this patent subsequent to Jan. 12, 2010 has been disclaimed.

[21] Appl. No.: 2,500

[22] Filed: Jan. 6, 1993

Related U.S. Application Data

[63] Continuation-in-part of Ser. No. 868,102, Apr. 14, 1992, Pat. No. 5,179,499.

[51] Int. Cl.$^5$ ............................................... H01G 5/14
[52] U.S. Cl. .................................... 361/281; 361/289; 361/296; 310/309
[58] Field of Search ........................ 156/628, 630, 625; 250/306, 307; 361/311, 312, 313, 278, 281, 290, 289, 296; 310/309; 333/235

[56] References Cited

U.S. PATENT DOCUMENTS

| | | | |
|---|---|---|---|
| 2,883,593 | 4/1959 | Jennings | 361/289 |
| 2,975,307 | 3/1961 | Schroeder et al. | 310/6 |
| 3,213,340 | 10/1965 | Robertson | 361/289 |
| 3,447,047 | 5/1969 | Lindsay | 361/289 |
| 3,835,338 | 10/1974 | Martin | 310/8.6 |
| 4,381,672 | 5/1983 | O'Connor et al. | 73/505 |
| 4,520,570 | 6/1985 | Bednorz et al. | 33/180 R |
| 4,668,865 | 5/1987 | Gimzewski et al. | 250/306 |
| 4,764,244 | 8/1988 | Chitty et al. | 156/630 |
| 4,831,614 | 5/1989 | Duerig et al. | 369/101 |
| 4,841,191 | 6/1989 | Takata et al. | 310/317 |
| 4,987,303 | 1/1991 | Takase et al. | 250/306 |
| 5,043,577 | 8/1991 | Pohl et al. | 250/306 |
| 5,055,838 | 10/1991 | Wise et al. | 340/870.37 |
| 5,175,521 | 12/1992 | Larson | 333/235 |
| 5,179,499 | 1/1993 | MacDonald et al. | 361/313 |

Primary Examiner—Bruce A. Reynolds
Assistant Examiner—Gregory L. Mills
Attorney, Agent, or Firm—Jones, Tullar & Cooper

[57] ABSTRACT

Mechanically movable microstructure fabricated from a single crystal such as silicon and actuator structures for providing a high degree of controlled, precision motion of nanometer-scale variable impedances.

22 Claims, 7 Drawing Sheets

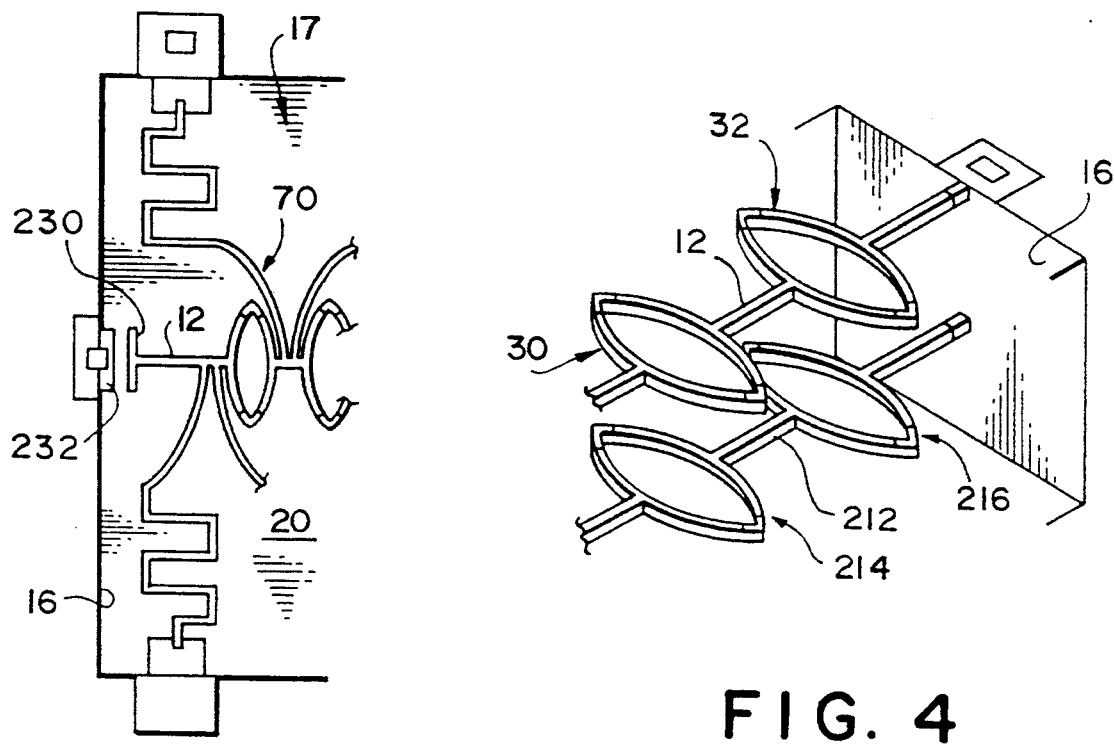
FIG. 6
FIG. 4
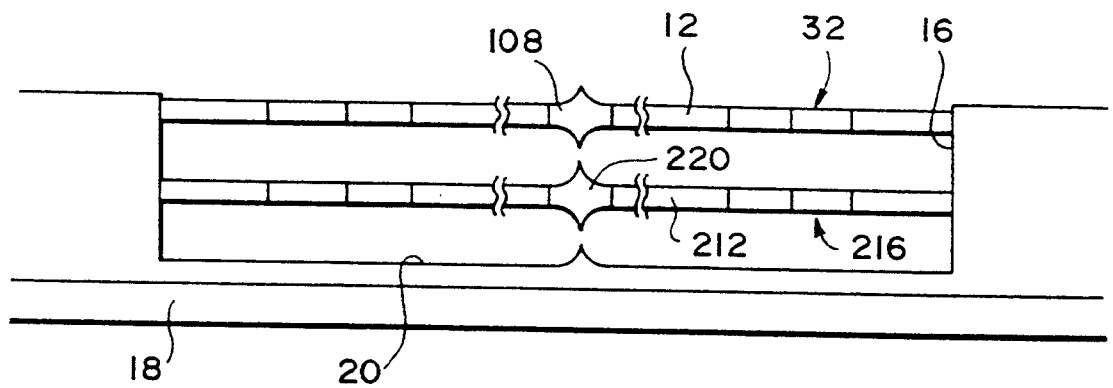
FIG. 5

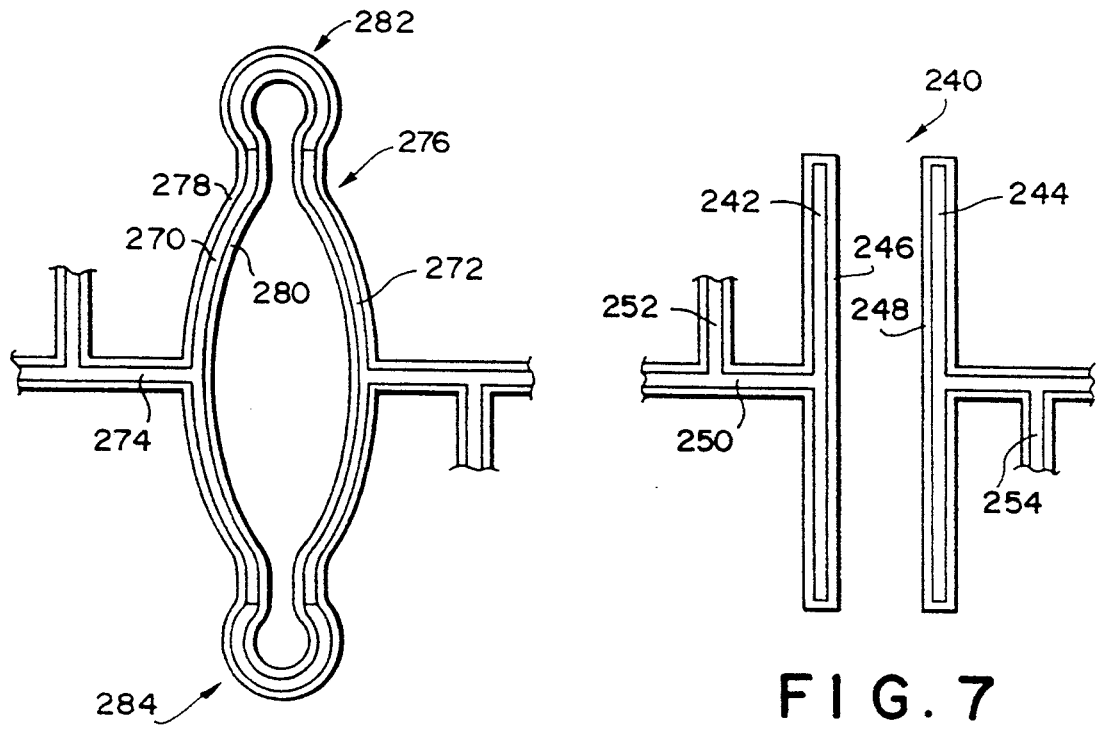
FIG. 9
FIG. 7
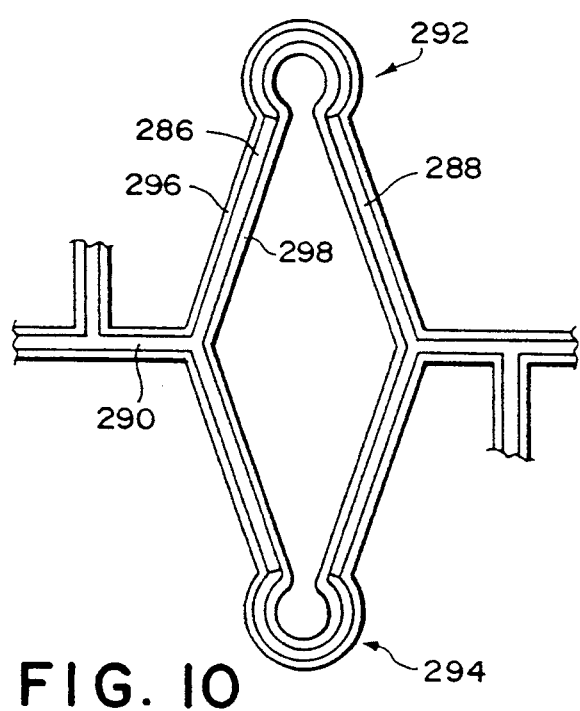
FIG. 10
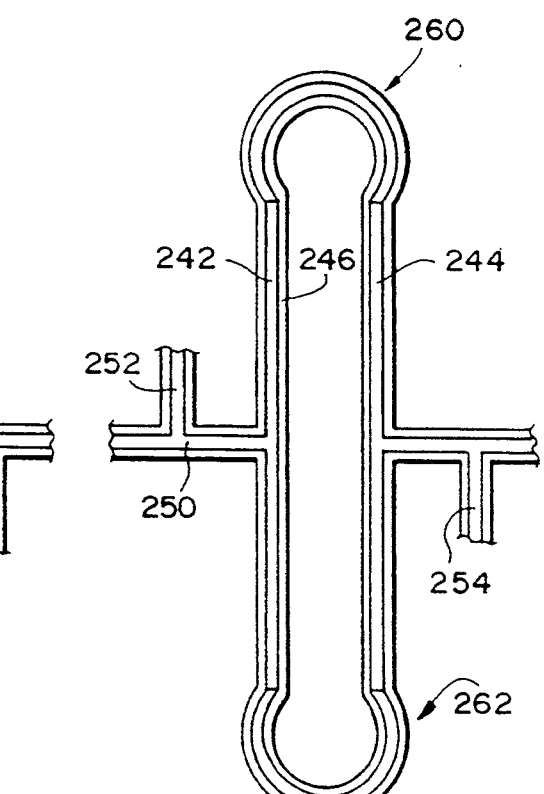
FIG. 8

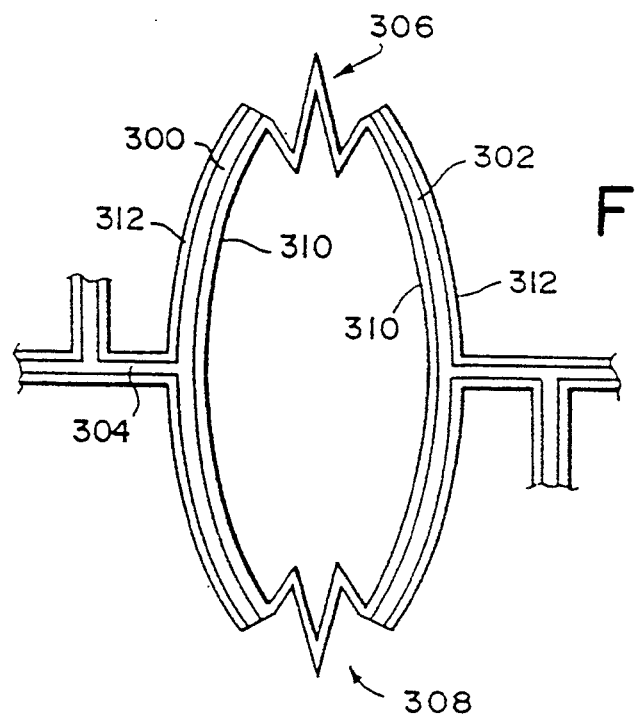
FIG. 11
FIG. 12
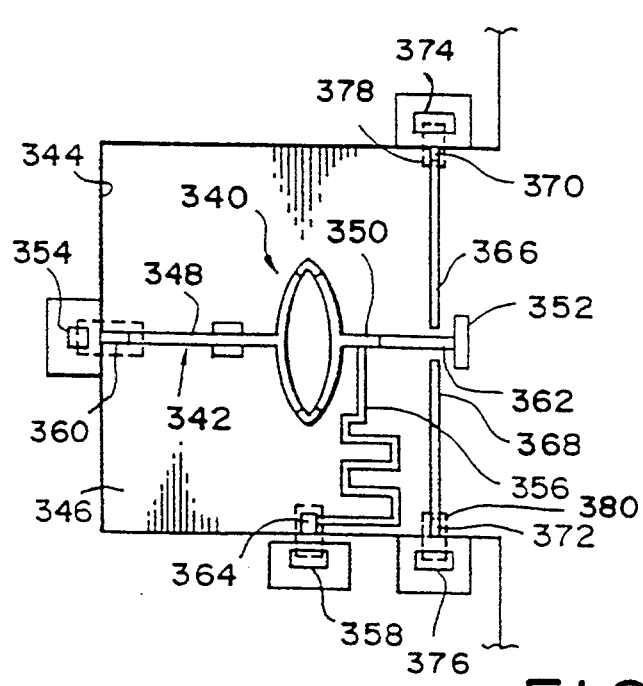
FIG. 13

MULTI-DIMENSIONAL PRECISION MICRO-ACTUATOR

This invention was made with government support under Grant No. ECS-9212900, awarded by the National Science Foundation. The government has certain rights in the invention.

This is a continuation-in-part of application Ser. No. 07/868,102, filed Apr. 14, 1992, now U.S. Pat. No. 5,179,499, entitled "Multi-Dimensional Precision Micro-Actuator".

The present invention relates, in general, to mechanically movable microstructures fabricated from a single crystal, such as silicon, and more particularly, to actuator structures for such devices for providing a high degree of controlled, precision motion of nanometer-scale variable impedances.

Copending U.S. application Ser. No. 07/699,390, now abandoned filed May 14, 1991 and entitled "Integrated Scanning Probe" and copending Ser. No. 07/868,138, filed Apr. 14, 1992 now U.S. Pat. No. 5,235,187, which is a continuation in part of Ser. No. 699,390, relate to microstructures of the general type to which the present invention is directed and further describe fabrication techniques for such structures. The microstructures disclosed in those applications particularly relate to self-aligned nanometer-sized probe tips fabricated on chips and to vertically stacked, integrated tunneling tips for use in sensors, and to analytical instruments which are based on movable, self-aligned, finely pointed tip pairs. Such tip pairs are produced, for example, on single crystal, polycrystalline or amorphous silicon beams fabricated on the surface of, or in apertures in silicon chips and are fully integratable with electronic circuits on such chips. The copending applications further disclose unique mounting structures for such scanning and tunneling tip pairs which permit both detection and control of tip motion, and accordingly the disclosures of the aforesaid application Ser. No. 07/699,390 and its CIP application Ser. No. 07/868,138 are hereby incorporated herein by reference.

Microfabrication techniques are described in both Ser. Nos. 07/699,390 and 07/868,138, wherein the selective oxidation of a single crystal substrate produces electrically and thermally isolated, released, single crystal structures such as beams and islands, and provide nanometer-scale self-aligned tips carried by such beams or islands. The self-aligned tips may have conical or wedge shapes and may be either horizontal or vertical pairs or stacks of multiple pairs on beams which are separated from the underlying substrate. Separation is achieved by selectively removing material to provide cantilevered and insulated structures which allow relative three-dimensional movement of the tips in the aligned pairs.

The fabrication techniques disclosed in the aforesaid applications begin with a process in which a solid structure consisting, for example, of an island, is electrically and then mechanically isolated from its underlying substrate. The structure is formed from a single crystal of material such as silicon, by selective lateral oxidation and then is released. In one preferred process, islands of silicon (for example) are first formed by etching trenches in a silicon substrate chip. The structure is then isotropically or anisotropically recess-etched around the bottom portion of the islands and the recesses are thermally oxidized in a lateral direction to produce isolated silicon islands. The degree of isolation of each island is tailored by controlling the lateral oxidation of the material connecting that island to its underlying substrate. By controlling this lateral oxidation, the support material is selectively removed so that tapered or conical silicon filaments of 10 to 100 nm in width can be formed between a silicon island and the underlying silicon substrate. By further oxidation, the filaments can be removed at the narrow part of the connection to form self-aligned tips or wedges having ends which taper to the diameter of the filament, or less, thus producing nanometer-scale dimensions at the ends of the tips. The tips so produced can be used in microscopic versions of analytical instruments which are fully integrated with electronic circuits on the same silicon chip.

The beam or beams which support the self-aligned tips may be formed, through the same patterning and etching techniques, to incorporate mounting springs which permit axial as well as lateral and vertical motion of the beams with respect to a surrounding substrate. In addition, the beams may be formed to incorporate capacitive or magnetic drive structures which may be energized by suitable potential differences or magnetic fields to produce controlled motion in the beams. In a preferred form of the invention as described in Ser. No. 07/699,390 and in CIP application Ser. No. 07/868,138, a pair of coplanar linear beams are fabricated to intersect each other at right angles, with the beams being connected to each other at their intersection to form an X-shaped tip support in, for example, a horizontal plane. The beams are cantilevered above a substrate and are mounted by means of integral springs so that each beam is movable axially and laterally in the horizontal plane defined by the beams, and is also movable vertically with respect to that plane. One tip of a self-aligned tip pair preferably is formed at the intersection of the beams and circuitry is provided to detect the relative motion of the beams with respect to a second of the self-aligned tip pair, the second tip being mounted adjacent to the first tip. This second tip may be formed on a planar surface adjacent to the beam so that it is stationary, or it may be mounted on a cantilever beam or a second pair of crossed beams also forming an X-shaped tip support. The second pair of crossed beams may also be mounted by means of springs to the surrounding base, with each X-shaped tip support thereby being movable in its own plane in X and Y directions, and vertically in a Z direction.

As disclosed in the aforesaid applications, each pair of beams in the linear crossed-beam configuration carries corresponding capacitive drive structures for controlling and sensing the motion of the respective beams, and thus of the tips which they support. In one form of the invention, the capacitive drive consists of movable "comb"-shaped capacitors on each end of each beam between the respective springs and the surrounding stationary base. The springs produce restoring forces when the beams are moved by energization of the capacitors. In addition, opposed capacitive plates may be provided on the surfaces of the beams for controlling and sensing vertical motion. Such a structure permits precise and accurate measurement of, or control of, the relative motion between opposed aligned tips to allow a wide variety of microscopic and analytical measurements.

In another form of the invention described in the aforesaid copending applications, the self-aligned, opposed tips may be formed at the intersection of a pair of crossed offset beams, wherein each beam is formed of two opposed, generally L-shaped beam segments, with corresponding legs of the segments being interconnected by a tip support leg to form the beam. Capacitive plates are formed on the sides of each of the beam segments to move the segments laterally, with the resilience of the material from which the beams are formed and the length of the beams serving to provide the spring action required for proper control of the motion of the tip mounted at the intersection of the support legs.

Although the spring and capacitor structures described and illustrated in Ser. No. 07/699,390 and in Ser. No. 07/868,138 provide accurate and reliable supports and permit precisely controlled motion in the movable tips, the need to form the springs and the drive capacitors as separate elements imposes undue complexity on the structure. Furthermore, both the comb structure interposed in the tip support beam to provide longitudinal motion and the capacitive plate structure located adjacent the tip support beam to provide lateral motion have been found to be limited in the range of motion which they can provide for the tip. Thus, for example, the comb structure has a limited axial motion which is dependent upon the depth of the comb structures; furthermore, the spacing between the adjacent capacitive plates of the comb structure results in limited lateral motion and reduces the available capacity for controlling or sensing motion.

Although integrated circuits have become commonplace, a recurring problem, which remains largely unsolved, is the need to incorporate such circuits with variable impedance devices for use with a variety of sensing and color systems. Such variable impedances typically require movable mechanical structures which must be interconnected with suitable circuitry, and although the circuits can be in the form of extremely small integrated chips, the mechanical structures are generally relatively bulky.

SUMMARY OF THE INVENTION

It is, therefore, an object of the present invention to provide an improved microactuator structure for supporting movable nanometer-scale structures.

It is another object of the invention to provide an improved microstructure for supporting nanometer scale devices and for providing precise and controllable motion of such structures.

A still further object of the invention is to provide a method of fabricating improved microstructures and in particular for fabricating nanometer scale devices capable of large-scale precision motion.

A more particular object of the invention is to provide relatively movable capacitive drive plates for supporting nanometer scale microstructures such as variable impedances, and wherein the capacitor plates permit large-scale precision motion of a structure in both longitudinal and lateral directions.

Another object of the invention is to provide a method of fabricating movable capacitive plates for providing longitudinal, or axial, motion of nanometer-scale structures upon the application of an electrical potential across the plates, and wherein the structure permits a wide range of lateral motion of the device without adversely affecting the axial motion.

A still further object of the invention is to provide a capacitive drive for microstructures which utilizes flexible relatively movable capacitive plates to provide a constant drive force over a wide range of motion of the microstructure under control.

Another particular object of the invention is to provide an actuator for precisely adjusting a variable impedance such as a variable capacitor in a microstructure, the actuator consisting of a plurality of drive capacitors serially arranged along a support beam for the impedance to be adjusted, the drive capacitors being selectably energizable to apply electrical fields across adjacent relatively movable, opposed drive plates to control the spacing between the opposed drive plates, and to thereby regulate the variable impedance carried by the beam.

Still another object of the invention is to provide actuators for a microstructure wherein a plurality of support beams each have a plurality of selectably energizable serial drive capacitors having relatively movable plates, the drive capacitors being fabricated in a common plane to support a common element for precise control of the motion of that element in that plane.

A further, and still more particular object of the invention is to provide an actuator for a microstructure wherein the actuator includes a plurality of drive capacitors arranged in parallel to support at least one variable impedance drive.

Another object of the invention is to provide a plurality of selectively energizable capacitive actuators having relatively movable plates arranged in series and/or in parallel to support self-aligned nanometer-scale variable impedance devices, and to provide selective activation of the actuators for precision control of impedance.

Briefly, the present invention is directed, in one preferred embodiment, to an integrated, single crystal silicon (SCS) microactuator structure which is capable of large scale precision motion in both X and Y dimensions of a plane. In one form, the microactuator is a shell-like oval ring which consists of two cantilevered, opposed, concave, relatively-movable single crystal silicon arms each having a cross sectional dimension of about 150 nm by about 1,000 nm. These two curved SCS arms form spaced capacitive drive plates which are electrically isolated from each other but which preferably are mechanically joined at their outer ends by a suitable isolating material such as a coating or layer of electrically insulating nitride. When an electric potential is applied between the two curved SCS arms, an electric field is induced between them. The field is strongest near both outer ends of the opposed, concavely-shaped curved surfaces, where the plates are closest together. The outer ends are held in spaced relationship by the electrically isolating material which mechanically joins them. This material preferably is a thin, flexible strip (or strips) which may be bowed to form a bias spring connection between the opposed capacitor drive plates. The spring material is shaped to hold the drive plates in a predetermined relative position so that upon the application of a voltage across the plates, they will tend to move toward each other (or apart, depending on the polarity of the applied potential) against the spring bias. Upon release of the potential, the springs return the drive plates to their original spacing.

The capacitive drive plates are mounted in pairs and in series in a longitudinal beam to divide the beam into adjacent segments, with the drive plates of each pair being relatively movable in the longitudinal direction of the beam to lengthen and shorten the beam. The electric field force applied between the plates may attract the opposed plates (for example) to cause them and their respective beam segments to move toward each other. As this force tends to bring the outer ends of the plates closer together against the bias of the end springs, the middle portions of the opposed plates are also drawn toward each other so that the electric field force between the middle portions becomes stronger, causing the drive plates to flex inwardly, bringing them closer together and thereby adding to the force which draws the plates together. The electric field provides an increasing axial force throughout the inward motion of the plates which is in opposition to the increasing spring bias until the two opposed plates are uniformly close together so that the motion of the plates is linear with respect to the applied potential. The opposed curvature of the plates, acting as a mechanical spring bias, cooperates with the end springs to urge the plates apart in opposition to the electrical force field, exerted by the potential applied across the capacitive plates. In this way the axial motion of the drive plates, and of the beam in which they are mounted, can be precisely controlled. Any desired number of pairs of curved drive plates may be mechanically coupled together in series along the length of a beam to provide the desired length of longitudinal motion for the assembly. Pairs of drive plates can also be mechanically connected in parallel to provide the desired force for moving the tips. The movable beam may be in the form of a cantilever, secured at one end with its other end extending over and spaced above the underlying substrate so that it is free to move laterally and vertically, as well as to extend and contract longitudinally with the application of a potential, thereby providing three-dimensional motion of the actuator.

In one form of the invention, a microstructure such as a pair of crossed beams intersecting at a support region for opposed tips is provided, with the structure incorporating in each of the crossed beams one or more series capacitive actuators to provide longitudinal, or axial, motion in its corresponding beam. A first set of actuators provides axial motion along, for example, an X axis of the structure while a second set of actuators provides motion along a Y axis to produce two-dimensional controllable motion of the structure in the X-Y plane. Longitudinal, or axial, motion along the X axis produces lateral motion of the Y-axis beam, and vice versa. The range of motion of the structure is determined by the total number of individual capacitive actuators provided in series in each beam. The crossed beams are also movable in the Z direction, perpendicular to the X-Y plane of the structure.

Electrical potentials are applied to the opposed capacitive drive plates by means of flexible electrically conductive connector arms which accommodate the motion of the beams. The connector arms preferably are coplanar with the beams and the capacitive plates, and serve to electrically interconnect selected electrically conductive beam segments. Connector arms also may lead to circuit elements on the surrounding silicon chip to provide electrical connection to external control circuitry. These connector arms also provide cantilever support for the beams.

The fabrication sequence for the microactuator structure of the present invention is a modification of the selective lateral oxidation process described in the aforesaid U.S. Ser. No. 07/868,138. Lateral oxidation is used to define the beam and the capacitive actuator structures, with the structures being selectively released by means of hydrofluoric acid which isotropically etches away the field oxide beneath them. The modification includes the provision of a coating of silicon nitride film to provide mechanical support for the structure before the hydrofluoric acid releasing etch. The capability for forming silicon nitride segments which simultaneously electrically isolate while mechanically joining individual silicon elements of the actuator structure facilitates the construction of the microactuator structure. The series arrangement of the capacitive actuators between axially aligned beam segments provides the capability of mechanically amplifying the motion produced in a single actuator so that relatively large scale motion is attainable with relatively low electrical potentials, while the connection of parallel actuators provides added strength and precise control.

Although the invention is shown as utilizing two crossed beams, or four beam arms, to support a tip support region, it will be apparent that three radial beam arms equally spaced around the tip support region or more than four beam arms so arranged can be used to provide precise two-dimensional motion of the tip. Furthermore, plural beam arms can be connected in parallel with each other between a stationary mounting point and the tip support, with each arm having plural capacitors in series, in order to add to the control of the tip.

It will also be apparent that microstructure elements other than opposed, self-aligned tips may be moved and controlled by the capacitive actuators of the present invention.

For example, in another embodiment of the invention the capacitive actuator is used to drive a variable mechanical device such as a switch or a variable impedance. The switch may include a pair of relatively movable contacts which can be opened and closed upon the application of a control voltage across one or more capacitive actuators, while the variable impedance may be a variable capacitor. The movable microstructures preferably are connected with corresponding circuitry contained in the silicon substrate, or chip, which carries the microstructure. For example, the switch may be operated by the application of a selected voltage to an actuator to open or close circuitry carried on the substrate. Similarly, a variable impedance such as a variable capacitor, can be connected to tune a resonant circuit in a radio, for example.

The capacitive drive plates preferably are concave, but if desired various other shapes may be used. For example, the opposed plates can be flat and parallel to each other, they can be formed either with or without end bias springs, or the plates can be formed with complex curved or angled surfaces in order to obtain the desired control of the motion of the tip supported by the actuator of the present invention.

BRIEF DESCRIPTION OF THE DRAWINGS

The foregoing and additional objects, features and advantages of the present invention will become apparent to those of skill in the art from a consideration of the following more detailed description of a preferred embodiment thereof, taken in conjunction with the accompanying drawings, in which:

FIG. 4 is a simplified diagrammatic illustration in top perspective view of a parallel arrangement of microstructure actuators;

FIG. 5 is a side elevational view of the parallel actuator of FIG. 4;

FIG. 6 is a partial top plan view of a modified form of the microstructure of FIG. 3;

FIGS. 7-12 diagrammatically illustrate variations in the structure of the actuator of FIG. 1;

FIG. 13 is a diagrammatic illustration of a mechanical microswitch driven by the microactuator of the present invention.

DESCRIPTION OF PREFERRED EMBODIMENTS

Figure 1:
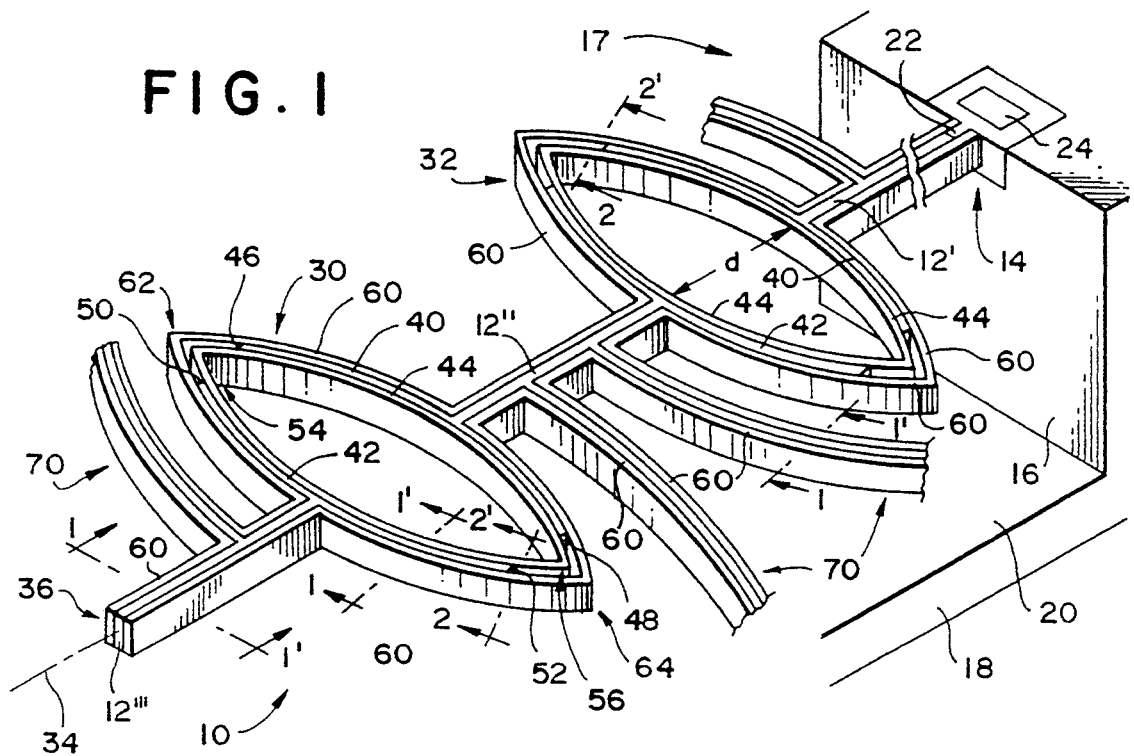
FIG. 1 is a perspective view of a pair of microstructure actuators constructed in accordance with the present invention.

Turning now to a more detailed consideration of the actuator of the present invention, there is illustrated in FIG. 1 a microstructure 10, which takes the form of a cantilever beam 12 secured at one end, for example at 14, to a fixed structure such as the surrounding vertical wall 16 of an aperture 17 formed in a substrate indicated generally at 18. The substrate 18 preferably is part of a wafer carrying a single crystal material, such as single crystal silicon, in which conventional integrated circuits may be formed in known manner, and which, in accordance with the invention, incorporates mechanically movable microstructure fabricated from the substrate material. Such an integrated microstructure has a wide variety of applications and thus is capable of functioning, for example, as a sensor in an analytical instrument such as a tunneling electron microscope. The cantilever beam 12 preferably is spaced above and is parallel to the horizontal floor 20 of the aperture formed in substrate 18 and may incorporate the self-aligned opposed tip structure described in the aforesaid copending application Ser. No. 07/868,138. By using a single crystal material such as silicon for the substrate, the beam 12 will be electrically conductive. Preferably, beam 12 includes an insulated portion 22 where it joins the wall 16 so that the beam is electrically insulated from the surrounding substrate. If desired, an electrical contact pad 24 may be located in the substrate near the end of the beam to provide a connection point for electrical leads which are to be interconnected between the beam and external circuitry such as may be incorporated in the silicon substrate 18.

In the illustrated embodiment, beam 12 is generally perpendicular to end wall 16 and extends outwardly therefrom in a horizontal plane which is parallel to the floor 20 of the aperture 17 in which it is formed. The beam, in accordance with the present invention, includes microactuators such as those illustrated at 30 and 32 which are connected in series along the beam to divide the beam into a plurality of longitudinally aligned segments which are relatively movable along the axis of the beam. The microactuators are capable of moving the beam 12 along its longitudinal axis 34 by moving the individual beam segments with respect to each other so that the free end of the beam, generally indicated at 36, can be moved axially toward or away from the fixed end 14 of the beam at wall 16 upon energization of the actuators.

Each microactuator, for example, actuator 30, is formed by a pair of opposed, concave arms such as arms 40 and 42, which are fabricated from the same material as is the beam 12 and the substrate 18 by a fabrication process to be described hereinbelow. The arms 40 and 42 preferably have rectangular cross sectional dimensions; for example, 150 nm by 1,000 nm, and are formed at the same time the beam 12 is formed. The arms are interposed in series in the beam and are electrically isolated from each other, as by a layer of insulating material 44 which, in a preferred form of the invention, also mechanically joins their opposite ends to hold them in the desired relationship. These arms are sufficiently thin, flexible and resilient to act as springs to hold the beam 12 in a rest, or neutral, position and shape.

As illustrated in FIG. 1, the arms 40 and 42 are generally horizontal so that they are parallel to floor 20, extend in a direction generally perpendicular to the axis 34 of beam 12, and are spaced apart along the direction of axis 34. The actuators 30 and 32 divide the beam into a series of axially aligned segments 12', 12" and 12''' (generally referred to as beam 12) and the opposed spaced arms of each actuator form the two plates of a capacitor. The outermost ends, or the upper and lower ends (as viewed in FIG. 1) 46 and 48 of concave arm (or plate) 40 are spaced apart from the corresponding upper and lower ends 50 and 52 of the opposed arm (or plate) 42, respectively, with the arms 40, 42 curving from the outermost ends toward their centers in a concave shape to electrically isolate them from each other. The insulating layer 44, which in the preferred embodiment is silicon nitride, extends beyond the ends 46 and 50 of the adjacent arms, as generally indicated at 54, to act as a flexible spacer to mechanically join and support the two opposed plates 40 and 42 at that upper end. Similarly, at the lower end (as viewed in FIG. 1) of the capacitive plates, the inner insulating layer 44 joins the two plates mechanically at 56. These two flexible spacers act as bias springs to position the relatively movable plates 40 and 42 at their rest position.

In the preferred form of the invention, the outer surfaces of plates 40 and 42 are also covered by an insulating layer 60 such as silicon nitride, which extends outwardly beyond the ends of the plates 40 and 42, as generally indicated at 62 and 64 to provide additional mechanical spacers and flexible bias spring supports for the capacitor plates, or arms, 40 and 42. It will be noted that the inner and outer insulating bias spring layers 44 and 60 are spaced from each other at the end portions 62 and 64; however, it is not essential that they be so spaced. Furthermore, where a single one of the layers 44 and 60 is sufficient to provide the required mechanical support and biasing, only one such layer, preferably inner layer 14 need be provided.

It will be understood that the second actuator 32, which is connected in series along the axis 34 with actuator 30, is constructed in a manner similar to actuator 30 and thus is not described in detail. The actuators divide the beam into relatively movable segments so that upon the application of a potential across the actuator plates, the plates can move axially with respect to the fixed end 14. This plate motion will move the segments and thus expand or contract the length of beam 12. Additional actuators may be provided in series along the length of beam 12 in sufficient numbers to provide the degree of axial motion that is desired for a particular application.

Although not essential, the insulating layer 60 may be continued along the side walls of the beam 12 as illustrated to provide a protective and mechanically supportive layer for the beam.

The application of electric potentials of opposite polarity to the two curved, opposed flexible plates 40 and 42 produces an electric field across the plates which is inversely proportional to the square of the distance between them, and which tends to draw the plates together. Initially, the force at the outer ends of the concave plates; i.e., between ends 46 and 50 and between ends 48 and 52, is greater than the force at the axis of the beam 12. Since the beam segments are relatively movable, the electric field force so produced tends to draw the opposed plates 40 and 42 together, causing the insulating support material at regions 54, 56, 62 and 64 to bend. The insulating material acts as a spring to resist the motion of the plates toward each other so that the amount of motion is determined by the applied potential. As the plates move together, they tend to flex from the concave shape toward a planar shape, so that the central portions of the plates move closer to each other, thereby increasing the total force applied to the plates.

The resilience of the plates resists the inward bending motion due to the applied potential to further bias the plates against the motion imposed by that potential, so that the mechanical structure acts as a spring bias against the inward force applied by the electrical potential and tends to return the capacitive plates to their original position upon reduction of the electrical potential. In this way, the motion along axis 34 of the segments of beam 12 which are connected to plates 40 and 42 is precisely controllable by the potential applied across these plates. In similar manner, the voltage applied across plates 40 and 42 of actuator 32 produces motion in that actuator and in the beam segments connected thereto. If the two actuators 30 and 32 are both energized at the same time, the motion of beam 12 along axis 34 will be the sum of the motion of each of the two actuators. Any number of actuators may be used along the beam to provide the desired amount of axial motion.

Electrical connections are provided to the capacitive plates 40 and 42 by means of connector beams generally indicated at 70, to be described. These connector beams are also formed of the same material as the beam 12 and plates 40 and 42, and preferably are covered by the insulating layer 60, previously described. It will be understood that the connectors 70 may be so arranged as to apply a selectable potential across all of the actuators in series, or the connectors can be fabricated so that each actuator can have a separate potential applied to it. Thus, for example, by applying potentials to individual actuators, it is possible to provide a digital control of the motion of beam 12, with the motion of the beam being proportional to the number of actuators that are energized. Alternatively, when the actuators are connected in series to the same potential, the motion of the beam will be cumulative of the motion of each actuator and will correspond to the selected value of the potential so that control is obtained not by the number of actuators that are energized, but by the magnitude of the potential applied to all the actuators. Any combination of these two methods of control may also be used.

It will be understood that the amount of longitudinal motion obtained by the actuators 30 and 32 is dependent upon the spacing between the capacitor plates 40 and 42 and accordingly, the axial motion available can be determined by the size of the various actuators. A range of actuator sizes varying from large to small can, therefore, be provided in series in a single beam to provide coarse and fine adjustments of beam motion through the application of potentials to selected capacitors. Within each capacitor, furthermore, the motion of the plates with respect to each other is linearly proportional to the applied voltage so that control is precise.

Figure 2:
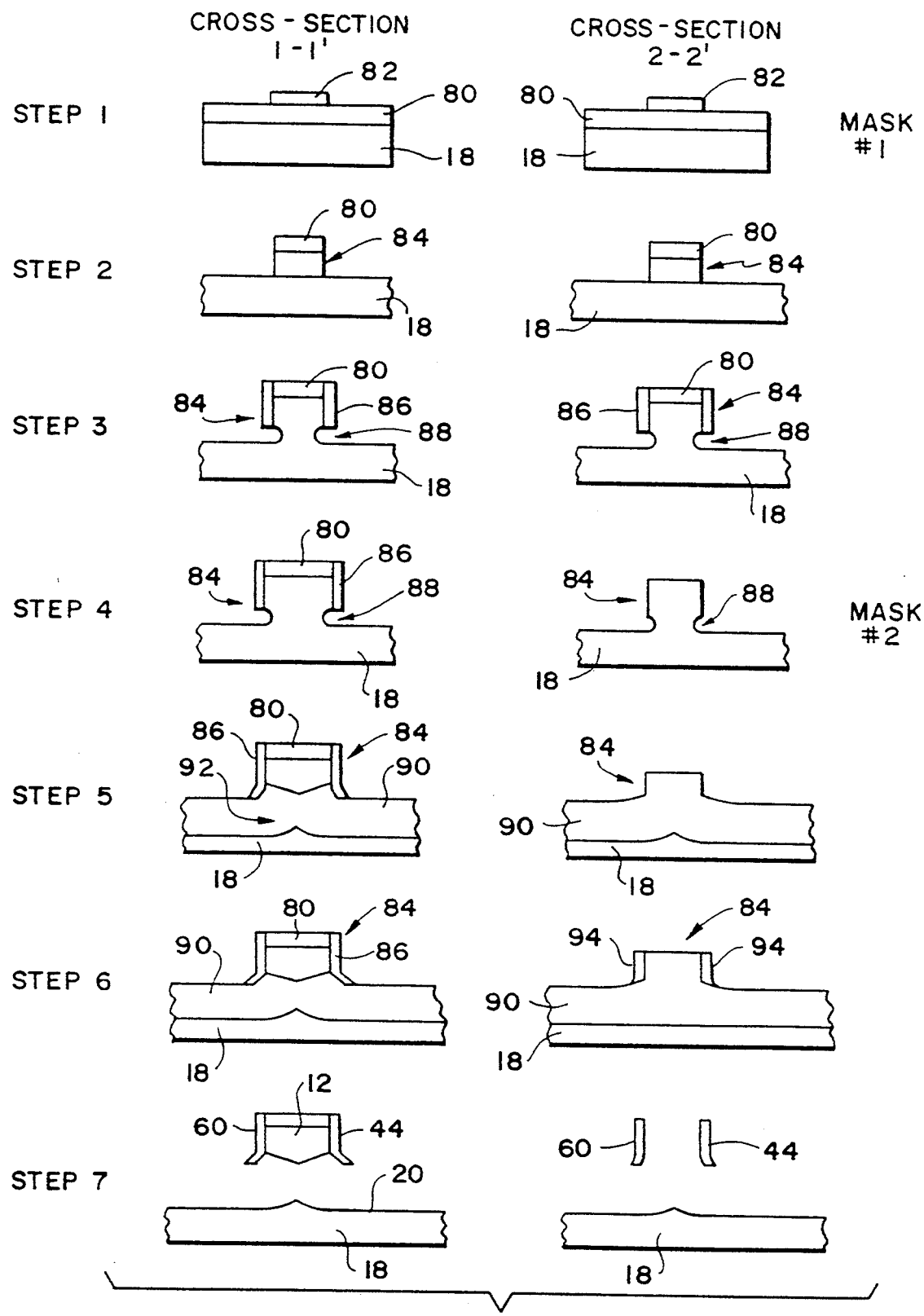
FIG. 2 is a diagrammatic illustration of the process steps used in fabricating the actuator of FIG. 1.

FIG. 2 illustrates in diagrammatic form a method for fabricating the beam 12, the arms 40 and 42, and their insulating layers 44 and 60 as well as the process for fabricating the end portions of the actuator where only insulating spacer and support layers are provided. The steps of FIG. 2 under the heading "cross section 1-1'" illustrate the former structure, while steps 1 through 7 under the heading "cross section 2-2'" illustrate the method for fabricating the end portions of the actuator. Sample locations of these cross-sections are illustrated in FIG. 1.

The starting substrate 18 preferably is an arsenic-doped, $n^{++}$, single crystal silicon wafer on which is coated a suitable dielectric top surface layer 80, the layer 80 preferably including silicon nitride. For example, the layer 80 may be an oxide-1/nitride-1/oxide-2(30/100/300 nm) dielectric stack which will cover the top of the island which is to be formed during a subsequent oxidation step. The relative thicknesses of the layers may vary; however, the layer 80 should include nitride as an oxidation mask for this process. The dielectric stack 80 is patterned, at step 1, in both cross sections 1-1' and 2-2' by a first mask using, for example, tri-level resist direct-write electron beam lithography and an aluminum lift off to thereby form mask 82. This mask, in top plan view, has the desired shape of the beam 12, of the actuators 30 and 32, and of the connectors 70. Thereafter, the dielectric layer 80 is etched around the mask 82 by reactive ion etching (RIE) in a $CHF_3$ chemistry without erosion of the aluminum mask 82. Mask 82 is then further used to transfer the pattern into the substrate 18 during a subsequent trench etch, illustrated in step 2. A $Cl_2/BCl_3$ chemistry consumes the aluminum layer 82 but leaves the top surface oxidation mask formed in layer 80 virtually intact, again as illustrated in step 2 of FIG. 2. This trench etch produces the aperture 17 and its surrounding walls 16 in the silicon substrate 18, as described above with respect to FIG. 1, while leaving island 84 intact. Again, the shape of the island in top plan view is that which was defined by mask 82 and corresponds to a desired microstructure, such as that illustrated in FIG. 1.

The silicon wafer 18 is then completely coated with a second dielectric layer 86 including silicon nitride, and this layer is then anisotropically etched to clear the bottom of the trenches surrounding island 84. The second dielectric layer remains on the side wall of the island, as indicated at 86, the thick layer 80 at the top of the island insuring that the bottom of the trenches can be over-etched to expose the silicon substrate without eroding completely through both layer 86 and the masking layer 80.

Thereafter, an isotropic recess etch is performed to etch the top surface of the silicon layer 18 to thereby produce a recess 88 in the sides of the island 84. The recess extends beneath the nitride layer 86 on the side walls of the island and starts the process of separating the island 84 from the underlying substrate 18. Thus, this etching step reduces the width of the island in the region of recess 88.

The island 84 may have any desired shape in its top plan view, and thus may be rectangular, round, square or configured in any desired way, depending upon the desired shape and dimensions for the beam 24, for the actuators 30 and 32 and for the connector beams 70. In addition, the island is shaped for the production of conical tips or wedges at selected locations, again in the manner described in copending U.S. application Ser. No. 07/699,390. It will be understood that the recess 88 extends completely around the island 84 in order to control the subsequent lateral oxidation step.

Step 4 of the process illustrated in FIG. 2 is a selective stripping of the dielectric layer 80 from the island 84 to permit selective oxidation of parts of the island for the purpose of providing electrical isolation of the remainder of the island. This stripping of layer 80 is not illustrated at the cross section 1-1 in FIG. 2, since that represents the beam 12 and the capacitive plates 40 and 42 which are to remain electrically conductive, but such oxidation may be provided at other parts of the beam structure, such as at region 22 (FIG. 1) and at cross section 2-2' of the actuator. Such a selective stripping of portions of the dielectric layer 80 is carried out by means of a suitable mask such as Mask #2 used in this process.

Oxidation of the exposed silicon material 18 in the trenches in the recesses 88, and in recesses formed by stripping layer 80, is carried out to form a silicon dioxide layer 90, as illustrated in step 5. This oxidation extends laterally into the recesses 88, thereby reaching under the part of the island 45 protected by layer 86, and also extends into the beam 12 in the recesses formed in layer 80. As the oxidation process proceeds, it forms the layer 90 in the recess and pushes the lower edge of layer 86 outwardly, as illustrated generally at 92 in step 5. The oxidation proceeds at a substantially constant rate in the silicon material, and it will be understood that the deeper the recess 88, the more quickly the top part of island 84 will be undercut and isolated from substrate 18 by the oxidation process. As noted at 92 in step 5, at cross section 1-1', the undercutting process produces an opposed tip-shaped profile between the bottom of island 84 and the top surface of substrate 18. The spacing and sharpness of these opposed tips can be carefully controlled by regulating the oxidation process. In those parts of beam 12 where no tips are required, and throughout the length of the capacitor arms 40 and 42 as well as along connector beams 70, such tips are generally not required, and accordingly the oxidation process continues until the island 84 is spaced above the silicon layer 18 by a distance sufficient to provide freedom of motion of the cantilever structure when it is released, as described below.

The oxidation process of step 5 also oxidizes the island 84 in the region 22 and at cross sections 2-2', since island 84 is unprotected by the nitride layers 80 and 86 in those selected areas.

In step 6, a silicon nitride layer is again deposited over the entire surface and then is isotropically etched back, to provide nitride side walls 94 on the island portion 84 at cross sections 2-2' and to provide a thickened nitride side wall 86 on the island portion 84 at cross sections 1-1'.

At step 7, selected portions of the field oxide layer 90 are isotropically etched away. As indicated at cross section 1-1' in FIG. 2, this releases the island 84 from substrate 18 at such locations to form the cantilevered beam 12 with its side wall layers 44 and 60 of silicon nitride spaced above the floor 20 of the substrate 18. At cross sections 2-2', the removal of the oxide layer 90 isolates the nitride side walls 94 to produce the spaced apart nitride support and spacer layers 44 and 60 which then serve to mechanically support the opposed capacitive plate beams 40 and 42, in the manner described above with respect to FIG. 1.

Figure 3A:
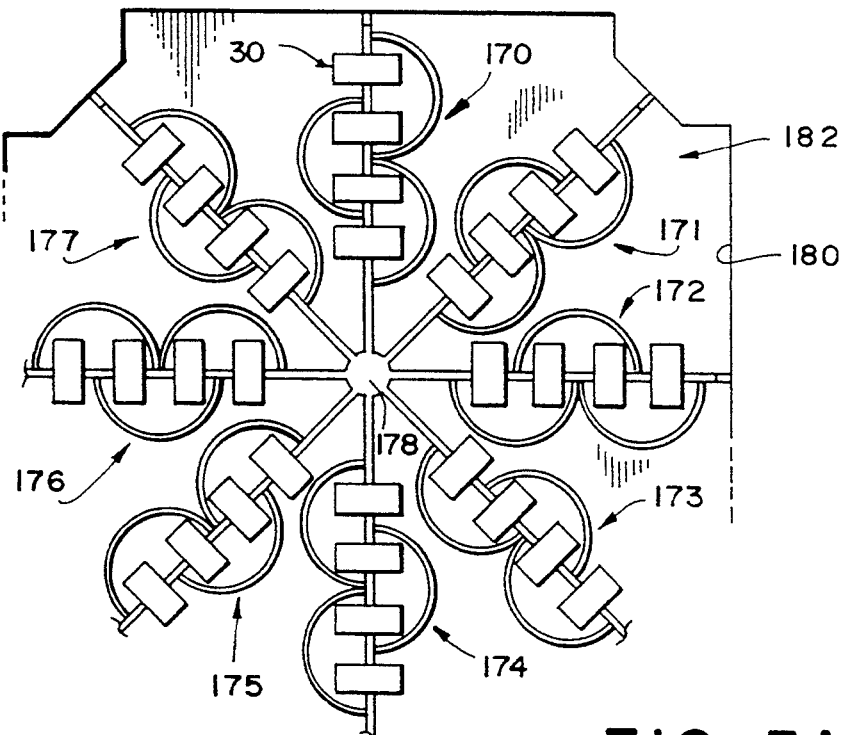
FIGS. 3 and 3A are top plan views of microstructures movable in an X-Y plane under the control of a plurality of actuators constructed in accordance with the present invention.
Figure 3:
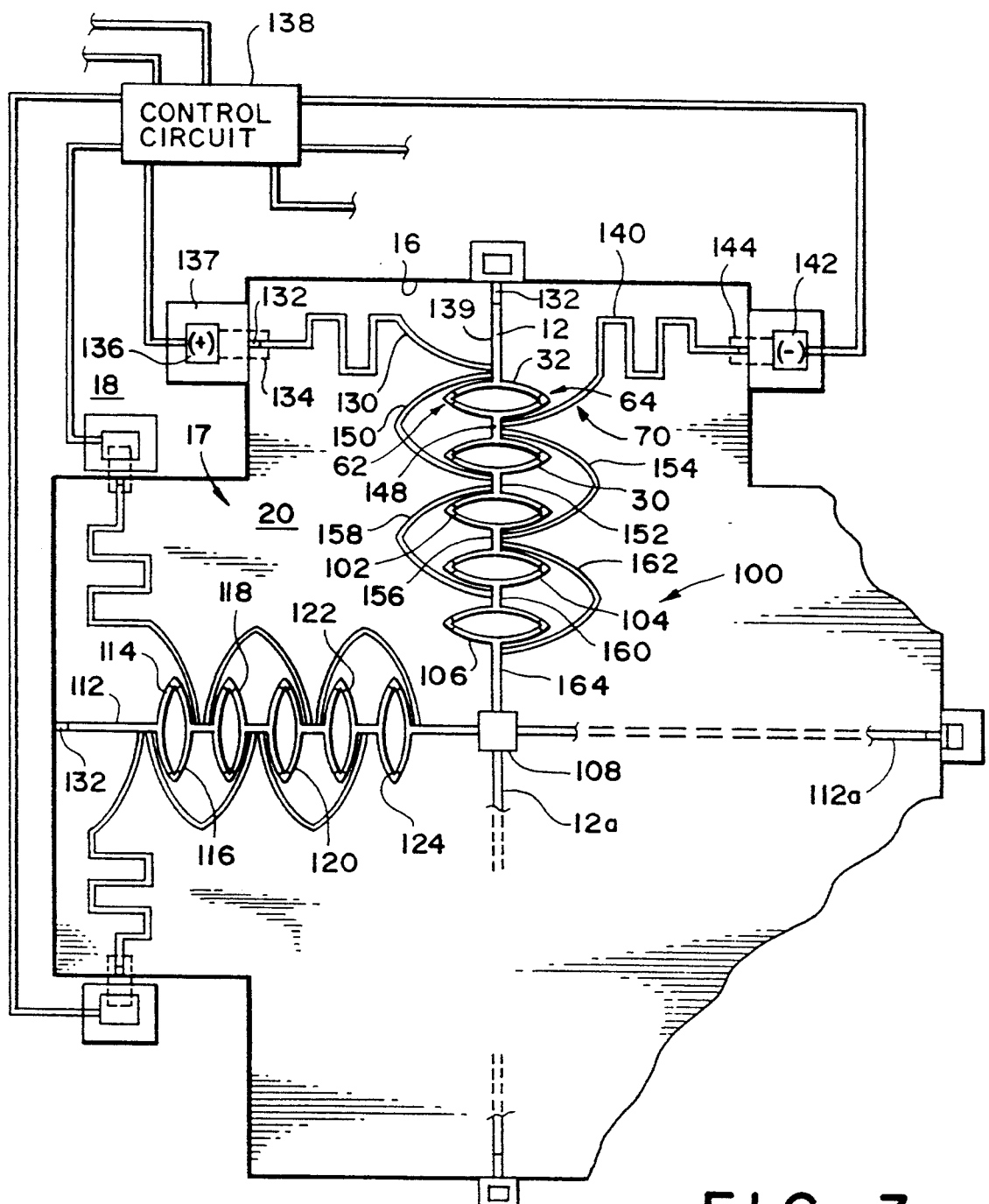

As indicated above, any number of actuators can be connected in series in beam 12 to produce a desired degree of mechanical motion. FIG. 3 illustrates in diagrammatic form an integrated microstructure which utilizes a multiplicity of actuators interposed in crossed beams to provide precision motion in X and Y directions for a wide range of instrument, sensor, and other applications. Thus, for example, the actuators 30 and 32 of FIG. 1 may be a part of a microstructure of the crossed beam type generally indicated at 100 in FIG. 3. In this case, the beam 12 is extended through additional series actuators 102, 104 and 106 to a central support area 108 to provide a first Y-axis support leg for area 108. A duplicate of beam 12 may be provided on the opposite side of support area 108 (as viewed in FIG. 3) to provide a second Y-axis support leg 12a (shown in part). In similar manner, left and right beams 112 and 112a provide X-axis support legs for support area 108, the X and Y portions cooperating to provide controlled precision motion of area 108 in the X-Y plane defined by legs 12, 12a, 112 and 112a. It will be understood that support area 108 may incorporate one or more nanometer-scale tips which preferably would include a tip which is part of an opposed, self-aligned tip pair formed in the substrate during fabrication of the actuator beams, using the lateral oxidation steps described above with respect to FIG. 2. Alternatively, the support area 108 may incorporate other mechanically movable devices such as a switch arm, variable impedance, or the like.

As illustrated, the beam 112 includes series actuators 114 through 124 while beam 112a provides similar series actuators (not shown) to provide motion along the X axis of microstructure 100. Since the beams 12, 12a, 112 and 112a are all separated from and cantilevered over the floor 20 formed in the substrate, the axial motion of Y-axis beams 12 and 12a shifts X-axis beams 112 and 112a in their lateral directions. Similarly, axial motion of X-axis beams 112 and 112a shifts Y-axis beams 12 and 12a in their lateral directions, thereby providing freedom of motion of area 108 in the X-Y horizontal plane. Because of the mechanical connections at the ends of the corresponding capacitor plates of the individual actuators provided by the spacers 54, 56, 62 and 64 described above, lateral motion of the beams will not shift the actuator plates with respect to each other, and accordingly such motion does not change the electrostatic force applied across individual actuators by the applied potential. As a result, the motion of the tip carried by section 108 can be precisely controlled in any direction.

Electrical connections to the actuator plates are made by way of connectors 70, as discussed above. One arrangement of such connectors for providing the same potential across each of the series actuators in one leg of the microstructure 100 is illustrated in FIG. 3. The connectors 70 are fabricated using the process of FIG. 2 at cross-section 1-1', and thus they include a central beam portion and nitride layers on the side walls. However, the nitride layers on the actuators, on the beam and on the connectors are not illustrated in FIG. 3 for simplicity, although the nitride mechanical connections between the actuator capacitor plates are generally indicated in simplified form at 62 and 64.

In the embodiment of the invention illustrated in FIG. 3, which is exemplary of the wide variety of microstructures that can be used in combination with the actuators of the present invention, a first one of the connectors 70 is mechanically connected, as illustrated by connector 130, between the beam 12 and the wall 16 of the surrounding substrate 18. The connector 130 is fabricated as a cantilever over the floor 20 of aperture 17, and may include an insulating segment 132 adjacent wall 16 for electrical isolation from the substrate 18. An aluminum conductor 134, shown in dotted lines, provides an electrical path between connector 130 and an electrical contact pad 136 on the substrate 18. Pad 136 may be located within an insulator 137 on the surface of the substrate, and may be used to make electrical connection with an external control circuit 138 for supplying control potentials to the actuators. Circuit 138 may be a suitable integrated circuit fabricated on the same chip or wafer on which the microstructure 100 is located to provide a voltage, for example a positive voltage, by way of connector 130 to a first segment 139 of beam 12. Since beam 12 is fabricated from an electrically conductive material and is insulated from the wall 16 by an insulator 132, this places a positive potential on the upper plate of actuator 32 (as viewed in FIG. 3).

A second connector 140 is connected to a negative electrical source at a second contact 142, also mounted on the substrate 18 adjacent wall 16, with electrical connection being made to connector 140 by way of a conductor 144, shown in dotted lines. Connector 140 is connected to a second segment 148 of beam 12, and thus provides a negative potential to the lower plate of actuator 32, again as viewed in FIG. 3. The application of a potential across actuator 32 produces a corresponding force between the upper and lower plates thereof and produces axial motion in beam 12, as previously explained.

Segment 148 of beam 12 extends between the lower plate of actuator 32 and the upper plate of actuator 30, thereby also applying the negative potential to the upper plate of actuator 30.

A positive voltage is applied to the lower plate of actuator 30 by means of a connector 150 which extends between segment 139 of beam 12 and a segment 152 of beam 12 connected to the lower plate of actuator 30. Accordingly, connector 150 transfers the positive potential from segment 139 to segment 152 so that this positive potential is applied to the lower plate of actuator 30. In similar manner, a connector 154 connects beam segment 148 to a fourth beam segment 156. A connector 158 connects segment 152 of beam 12 to a fifth segment 160 of beam 12 extending between actuators 104 and 106, while a connector 162 connects segment 156 to the last segment 164 of beam 12 below actuator 106. In this manner, the connectors 150, 154, 158 and 162 connect alternate sides of the actuators to opposite polarity electric potential sources so that upon application of a potential across pads 136 and 142, as from control circuit 138, all of the actuators 30, 32, 102, 104 and 106 are energized in series to produce motion in the Y-axis direction in accordance with the applied voltage.

The spring bias of the mechanical spacers between the plates of the several actuators serves to bias the actuators to their initial, or rest position, as discussed above. In addition, the connectors 150, 154, 158 and 162, are fabricated of the same materials and have similar cross-sectional dimensions as the beam 12, and accordingly are also flexible and resilient. By forming the connectors in a bowed shape, they will also serve as bias springs to return the actuators to an initial, or rest position. In similar manner, the actuators for beams 12a, 112 and 112a all are spring biased by means of such spacers and connectors, with all of the bias springs being shaped to balance the microstructure in a stable rest position. The actuators all are controllable by the application of selected potentials in the manner discussed above for arm 100, the application of potentials of opposite polarity causing the actuator plates to pull together to move their corresponding beams axially in a contracting direction and release of the potentials causing the spring bias loading of the capacitor plates to expand the beams axially, and to return them to their original positions. Thus, by applying selected potentials to the actuators on opposite sides of the central tip support 108, the support can be moved in the X-Y plane.

As indicated above, although the connections between the adjacent actuators are arranged so that the same potential is applied across each actuator in a given X or Y axis leg, it will be apparent that individual connectors can be utilized for each actuator, with insulating segments being provided in the beams between adjacent actuator plates so that individual control can be provided, if desired. In this way, each actuator can be energized with a selected potential so that digital control of the position of tip support 108 can be provided by suitable control circuits.

Although the beams 12, 12a, 112 and 112a are shown as being mounted in cantilever fashion to the side wall 16 of the substrate, it will be apparent that the beams may equally well be mounted on suitable pedestals formed on the floor 20 of the aperture 17. Such pedestals may be formed during the fabrication of the beams using the method of FIG. 2, with the pedestals being formed of a suitable oxide so as to insulate the beams from the substrate floor. One of the main features of the microstructure of this invention is that it is cantilevered over the floor 20 so as to be freely movable along the X and Y axes, as well as in a perpendicular, or Z axis direction, with the outer ends of the beams being fixed so as to provide a reference point for the motion of the beams. The connecting spacers 62 and 64 (illustrated in FIG. 3) and the connectors which extend between the adjacent segments all provide mechanical support for the structure so that it will remain essentially parallel to and spaced from the floor 20 and will lie in an X-Y plane. The microstructure is extremely small and light in weight, so that the device is easily controllable by potentials applied to the connectors from the control circuit 138.

The microstructure of FIG. 3 is shown utilizing four controlling legs for locating the tip support 108; however, it will be apparent that any number legs can be utilized, depending on the degree of control required. For example, three legs spaced apart by 120° may be utilized to provide motion in the X-Y plane, one or two legs can be used if only single axis motion is needed, or a larger number of legs than the four illustrated in FIG. 3 may be used. For example, FIG. 3A illustrates the use of eight legs 170-177 extending radially outwardly from inner ends at a central support region 178 and secured at their outer ends to fixed supports such as the wall 180 of an aperture 182 formed in a silicon wafer. The use of a large number of control legs provides very precise control of the location of support region 178.

An additional embodiment is illustrated in FIG. 4 in diagrammatic form, wherein a beam 212 is illustrated as being fabricated to be in parallel with beam 12, the beam 212 carrying actuators such as those illustrated at 214 and 216. These parallel actuators are fabricated in the manner illustrated in FIG. 2, the process being modified to produce multiple stacked beams in the manner described in Ser. No. 868,138. Such parallel actuators may be provided to increase the force available for moving a tip support or some other structure supported in common at the ends of the beams, or may be used to independently move two structures, such as two independent tips fabricated in stacked relationship. The actuators may be fabricated in upper and lower parallel crossed beam structures of the type illustrated in FIG. 3, for example. The relationship of the beams 12 and 212 is illustrated in side elevation view in FIG. 5, which illustrates the fabrication of two vertically aligned tip pairs carried on supports 108 in beam 12 and 220 in beam 212.

It will be understood from the foregoing that a plurality of actuators are used in series to obtain a desired axial extension or contraction of a beam, while plural actuators may be used in parallel, either stacked or side by side, to obtain additional force.

FIG. 6 illustrates another form of the invention, wherein the beam 12 is supported only by the connectors 70, with one end of the beam being spaced from the wall 16 of aperture 17. The location of the end of beam 12 may be controlled by means of a capacitive plate 230 fabricated at the end of the beam and located adjacent a second plate 232 mounted on the side wall 16.

Although the actuators 30 and 32, illustrated in detail in FIG. 1 and shown diagrammatically in FIG. 3, preferably are concave in shape with the end connectors such as those illustrated at 54, 56, 62 and 64 being also generally concave and meeting at acute angles in the manner illustrated in FIG. 1, it will be apparent that numerous modifications may be made. Thus, for example, as illustrated in FIG. 7, an actuator 240 may consist of a pair of parallel spaced planar capacitive plates 242 and 244, with each carrying an insulating layer such as those illustrated at 246 and 248 for the plates 242 and 244, respectively. The plates 242 and 244 are fabricated in series with a beam 250 so as to divide the beam into longitudinal segments, in the manner discussed above, and a plurality of such capacitive plate pairs may be utilized in series in the beam 250, as previously discussed. These planar plates do not include end spacers, so the support and alignment of the beam relies, in this case, on connectors such as connectors 252 and 254 which correspond to the connectors 150 and 154, for example. In this arrangement, the connectors must be sufficiently strong to provide proper positioning of the aligned plates, but since the thickness of the connectors is easily controllable in the method of FIG. 2, their strength and rigidity can be predetermined in the manufacturing process to provide the required support for the plates. Alternatively, connectors extending around both ends of the plates for each connection may be provided so as to balance the plates and hold them parallel during axial motion of the beam.

The ends of the opposed actuator plates 242 and 244 can be open as illustrated in FIG. 7 and can be supported by the connectors 252 and 254 because the microstructure of the present invention has very little mass; for example, on the order of $10^{-13}$ kg, so there is almost no gravitational force to misalign the beams and plates. Furthermore, the electrostatic force supplied by a potential across the plates will be on the order of $10^6$ times greater than the gravitational force, so even a very small potential applied across the plates will serve to maintain them in alignment.

As illustrated in FIG. 8, the complexity of the connector arrangement can be reduced by providing the parallel planar plates 242 and 244 with flexible end spacers or connectors 260 and 262. These end spacers are formed from the insulating layer 246 in the same manner as the end spacers 54, 56, 62 and 64 in FIG. 1, although their shape is different, so as to provide a spring action between the parallel plates 242 and 244.

A modified actuator is illustrated in FIG. 9, wherein concave opposed plates 270 and 272 are connected in series in a beam 274. The plates are curved outwardly away from each other at their outer ends, as generally illustrated at 276, so as to be concave at the center and planar and parallel at their outer ends to provide a greater initial force between the plates than is available with the concave shape of FIG. 1. The insulating layers 278 and 280 on the outer and inner side walls of plates 270 and 272 are extended beyond the ends of the plates to form bowed spacers or connectors 282 and 284. These spacers are fabricated in the manner described with respect to FIGS. 1 and 2, and are shaped to provide an improved spring action between the plates 270 and 272 upon the application of potentials to these plates.

Another modification of the microactuator of the present invention is illustrated in FIG. 10, wherein each plate is flat but angled to form a generally concave, opposed plate structure. Thus, a pair of plates 286 and 288 are each shaped in a shallow V-shape so as to be generally concave and are interposed in a beam 290. The outer ends of the plates 286 and 288 are spaced and connected by flexible spacers or connectors 292 and 294 formed from the side wall insulating material 296 and 298.

Another variation of the actuator structure is illustrated in FIG. 11, wherein concave plates 300 and 302 are fabricated serially in a beam 304. The concave plates are similar to those of FIG. 1, with the ends of the plates being mechanically interconnected by means of flexible spacers or connectors 306 and 308. In this case, however, only the inner insulating layer 310 on the two plates 300 and 302 is extended beyond the ends of the plates to form the spacers 306 and 308, thus illustrating that only one such insulating layer need be used for this purpose. The outer layer 312 could equally well be used, if desired. Another variation illustrated in FIG. 11 is the particular shape of the spacers 306 and 308. As here illustrated, the spacers are angled rather than smoothly curved, but still serve as biasing springs for the plates. A wide variety of shapes may be utilized without departing from the present invention.

To provide additional surface area for the opposed capacitive plates, an interdigitated shape such as that illustrated in FIG. 12 may be utilized. As there illustrated, opposed parallel capacitive plates 320 and 322 are interposed in beam 324 in the manner previously described, and these plates are mechanically connected at their opposite ends by means of spacers or connectors 326 and 328, as previously described with respect to FIG. 8. However, in this case, the inwardly facing surfaces of the plates 320 and 322 carry a plurality of inwardly extending fingers such as the fingers 330 carried by plate 320 and the fingers 332 carried by plate 322.

These inwardly facing fingers are interdigitated, with their respective surfaces being spaced apart but parallel, so that upon the application of a potential across plates 320 and 322, that potential will also appear between opposed fingers 330 and 332, thereby increasing the surface of the capacitive plates and increasing the available force due to the applied potential. This interdigitated, or comb-like structure provides a constant force with applied potential as the plates move toward or away from each other. If desired, the end spacers 326 and 328 may be omitted.

Although the microactuator has been described in terms of controlling the axial motion of a beam carrying opposed tips at its free end, it will be apparent that other mechanical structures can equally well be supported and moved by this device. For example, as illustrated in FIG. 13, a microactuator 340, which preferably is similar to actuator 30 illustrated in FIG. 1, may be interposed in a beam 342 supported in cantilever fashion from a fixed structure such as wall 344 surrounding an aperture 346. The beam 342 extends above the floor of the aperture, as previously described, and is divided into two relatively movable segments 348 and 350 by actuator 340. At the outer, or free, end of segment 350 is a switch arm 352 which is movable along the axis of beam 342 upon application of a potential across actuator 340.

A potential is applied across the actuator by way of a beam segment 348 which is electrically connected to a pad 354 and by way of a beam segment 350, which is electrically connected by way of a connector 356 to a pad 358, the pads being formed in the surrounding substrate in the manner previously described. Beam segment 348 is insulated from the substrate by an insulating section 360, while segment 350 is electrically insulated from the switch arm 352 by an insulating section 362. In addition, segment 350 is insulated from the surrounding substrate by an insulating section 364 in connector 356.

Adjacent switch arm 352 is a pair of contacts 366 and 368, which preferably are supported in cantilever fashion from wall 344 and are insulated from the wall and the substrate at 370 and 372. These contacts may be connected to suitable external circuitry (not shown) by way of respective connector pads 374 and 376 and conductive layers 378 and 380. Motion of switch arm 352 is accomplished by energization of the microactuator 340 to contact beam along its axis. Such motion brings arm 352 into contact with contacts 366 and 368 to close the circuit between the contracts, thus providing an extremely small, light-weight electrical switch.

Figure 14:
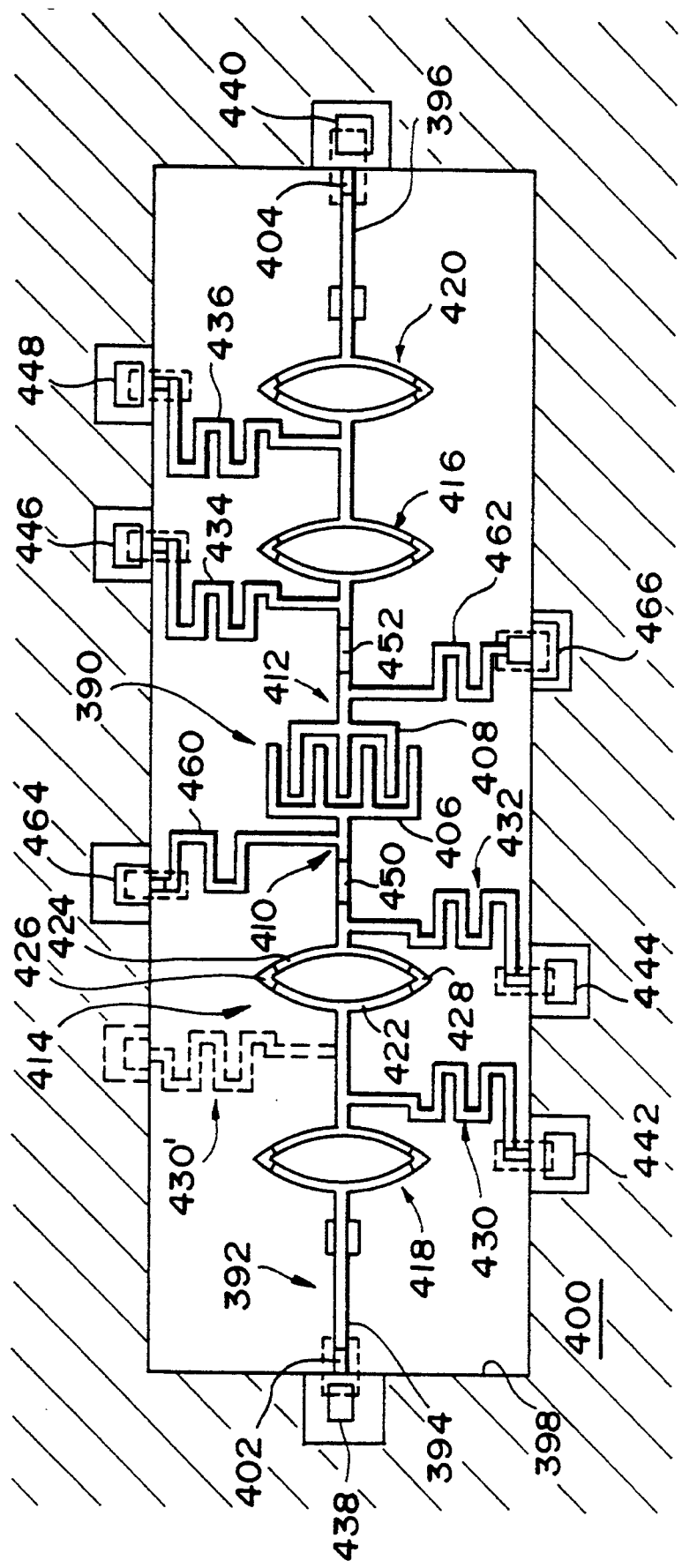
FIG. 14 is a diagrammatic illustration of a variable impedance driven by the microactuator of the present invention.

FIG. 14 illustrates another example of a mechanical structure driven by the actuator of the present invention. In this illustration, the driven structure is a variable impedance 390, which may be, for example, a variable capacitor. In this embodiment of the invention, the impedance 390 is in series with an elongated beam 392 mounted at its opposite ends 394 and 396 to a support structure such as a wall 398 formed on a substrate 400. The beam is fabricated from the material of the substrate, preferably single crystal silicon, as described above, and includes insulating segments 402 and 404 at its ends to electrically insulate the conductive beam from the substrate.

The variable impedance 390 includes two relatively movable portions, such as opposed comb-shaped capacitor plates 406 and 408, which divide the beam 392 into two relatively movable sections, generally indicated at 410 and 412. To adjust the variable impedance, at least one of the beam sections incorporates an actuator, such as actuator 414 in section 410, so that the corresponding beam section is axially movable. The other beam section 412 may be fixed, or may also be axially movable, as by a second actuator 416 in section 412.

In the illustrated embodiment, each beam section includes two serially-connected actuators, so that section 410 includes actuator 414 and a second actuator 418, and section 412 includes actuator 416 and a second actuator 420. Each actuator preferably is similar to the actuator 30 described above with respect to FIG. 1, and thus includes a pair of concave, opposed drive plates 422 and 424 separated by insulating spacer springs 426 and 428. Upon application of a potential across any of the actuators, their opposed drive plates will move and the beam section in which that actuator is located will be axially extended or contracted to move the corresponding relatively movable portion of the variable impedance 390. Thus, the application of a voltage across one or both of actuators 414 and 418 will move beam section 410 axially, and thus will move plate 406 of impedance 390, while application of a voltage across one or both of actuators 416 and 420 will move beam section 412, and thus plate 408 of impedance 390, in an axial direction.

Potentials are applied across the actuators by way of beam ends 394 and 396, conductors 430, 432, 434 and 436 connected at one end to beam 390 and by way of corresponding connector pads 438 440, 442, 444, 446 and 448, located on the substrate, as described above. Insulating segments 450 and 452 electrically separate the actuators from the variable impedance. Application of a selected potential between connector pads 438 and 442 activates actuator 418, a potential across pads 442 and 444 activates actuator 414, a potential across pads 446 and 448 activates actuator 416, and a potential across pads 448 and 440 activates actuator 420.

As illustrated, conductor 430 supplies a potential to both actuators 414 and 418. If desired, an insulating segment can be fabricated between these two actuators, and another conductor (shown in dotted lines at 430') can be provided so that each actuator is supplied by two independent conductors and connector pads.

The two capacitor plates 406 and 408 of variable impedance 390 are connected to external circuitry (not shown) by way of a pair of conductors 460 and 462 and corresponding pads 464 and 466 on substrate 400. These conductors may be used, for example, to connect the capacitor plates into a tuned circuit such as might be used in a conventional radio circuit. Upon application of a potential across one or more of the actuators, the length of beam 392 is varied to adjust the spacing between plates 406 and 408 of impedance 390, thereby, in the example, changing the frequency of the tuned circuit in which the impedance is connected. The impedance can be continuously varied by the application of continuously variable potentials across selected actuators, or can be varied in discrete steps by application of selected potentials to selected actuators. For example, a first capacitor value can be attained by supplying a fixed voltage across one actuator, a second capacitor value can be attained by supplying the same fixed voltage across the two actuators, and so on. This allows a programmed variation of the value of the impedance 390 in discrete steps for use, for example, in producing stepped variations in the frequency of a timed circuity, by programming the application of voltages to corresponding actuators.

Although the capacitor 390 is shown as a comb-type device with interdigitated fingers, it will be apparent that the opposed, relatively movable plates may have any desired shape. Further, the capacitor can be replaced with a plurality of capacitors electrically connected in series or in parallel, which may be driven independently by corresponding actuators. Furthermore, the switch of FIG. 13 may be used in combination with the variable capacitor of FIG. 14 to connect or disconnect selected capacitors.

Because the microactuator is so small and light, it is capable of very rapid movement, and accordingly the present device is suitable for radio frequency switching. The variable impedance can be, for example, a 100 pf capacitor, and any number of these very small capacitances can be connected in parallel to provide a desired capacitance.

Although the present invention has been described in terms of preferred embodiments, it will be apparent that numerous modifications and variations can be made without departing from the true spirit and scope thereof, as set forth in the following claims.

What is claimed is:

1. A precision microactuator for movable microstructures, comprising:
    an integrated circuit wafer having a cavity;
    a cantilevered beam having a longitudinal axis and having a first end fixed to said wafer and a second remote end extending into said cavity;
    actuator means within said cavity between said first and second ends of said beam and dividing said beam into relatively movable, axially aligned, longitudinal segments;
    means for applying a potential across said actuator means to cause said relatively movable beam segments to move with respect to each other to cause said remote end of said beam to move along said longitudinal axis with respect to said fixed end to vary the length of the beam; and
    variable impedance means within said cavity and connected to said remote end of said beam for adjustment in response to application of said potential to said actuator means.

2. The microactuator of claim 1, wherein said variable impedance means comprises at least a first pair of capacitor plates, one plate of said pair being integrated with said remote end of said beam.

3. The microactuator of claim 2, wherein said actuator means comprises a second pair of capacitor plates dividing said beam into a corresponding plurality of relatively movable longitudinal segments.

4. The microactuator of claim 3 wherein said actuator means further includes flexible spring bias means connected to said second pair of capacitor plates.

5. The microactuator of claim 4, wherein said spring bias means comprises end spacer means between said second pair of capacitor plates.

6. The microactuator of claim 4, wherein said spring bias means comprises connector means connected to said beam segments.

7. The microactuator of claim 4, wherein said spring bias means comprises electrically insulating end spacer means between said second pair of capacitor plates.

8. The microactuator of claim 4, wherein said spring bias means comprises electrically conductive connector means connected to said beam segments.

9. The microactuator of claim 8, wherein said spring bias means further includes electrically insulating flexible end spacer means between said second pair of capacitor plates.

10. The microactuator of claim 1, wherein said means for applying a potential across said actuator means includes electrically conductive connector means connected between selected beam segments and electrical circuit means on said wafer.

11. The microactuator of claim 10, wherein said electrically conductive connector means comprises flexible connector arms which mechanically support and spring bias said beam segments and actuator means.

12. The microactuator of claim 1, wherein said variable impedance means comprises a first pair of capacitor plates having at least one plate integral with said remote end of said beam and wherein said actuator means comprises a plurality of pairs of capacitor drive plates spaced along said beam and dividing said beam into a corresponding plurality of relatively movable longitudinal segments.

13. The microactuator of claim 12 wherein said beam, said variable impedance means, said actuator means, and said integrated circuit wafer are fabricated from a single-crystal, electrically conductive substrate to form a cantilevered microstructure, the beam, the actuator means, and the variable impedance means being integrally formed from the substrate.

14. The microactuator of claim 13, further including a layer of electrically insulating material on selected surfaces of said capacitor drive plates.

15. The microactuator of claim 14, further including flexible spring bias means fabricated from said electrically insulating material and connected between opposed capacitor drive plates for maintaining said drive plates in a predetermined spaced relationship.

16. The microactuator of claim 15, further including electrically conductive connector means connected to corresponding segments of said beam, said connector means forming a part of said cantilevered microstructure.

17. The actuator of claim 16, wherein said connector means are integrally formed from the substrate.

18. The microactuator of claim 1, wherein said variable impedance means comprises first and second interdigitated capacitor plates, the first capacitor plate being connected to said remote end of said beam for motion with said beam with respect to the second capacitor plate.

19. The microactuator of claim 18, wherein said second capacitor plate of said variable impedance means is fixed.

20. The microactuator of claim 18 wherein said first and second capacitor plates of said variable impedance are connected between relatively movable segments of said beam.

21. A precision microactuator for movable microstructures, comprising:
    an integrated circuit wafer having a cavity;
    first and second axially aligned cantilevered beams, each beam having an axis, a first end affixed to said wafer and a second, remote, axially aligned end extending into said cavity, the remote ends of said beams being spaced apart;
    first and second actuators within said cavity and interposed between the first and second ends of said first and second beams, respectively, to divide each beam into relatively movable, axially aligned longitudinal segments;

means for applying selected potentials across each said actuators to selectively produce relative axial motion of said longitudinal segments for each of said beams to selectively vary the length of each beam; and a variable impedance connected between the remote ends of said beams, whereby variation of the length of either of said beams will vary said impedance.

22. The microactuator of claim 21, wherein said variable impedance comprises first and second capacitor plates integrally formed on respective remote ends of said first and second beams for relative motion upon selective variation of the lengths of said beams, said capacitor plates forming a variable capacitor.

* * * * *